United States Patent [19]

Hrivnyak

[11] 3,735,883

[45] May 29, 1973

[54] SPARE TIRE AND WHEEL CARRIER FOR PICK-UP TRUCKS

[76] Inventor: John Hrivnyak, 2055 Harvard, Berkley, Mich. 48072

[22] Filed: Aug. 13, 1971

[21] Appl. No.: 171,465

[52] U.S. Cl. ................................................214/454
[51] Int. Cl. ............................................B62d 43/00
[58] Field of Search.....................214/451, 452, 453, 214/454

[56] References Cited

UNITED STATES PATENTS 2,645,394   7/1953   Bord.......................................214/454
2,777,591   1/1957   Manzatuik..............................214/451
3,620,396   11/1971  Abfalter..................................214/454
3,494,493   2/1970   Fowler....................................214/454

Primary Examiner—Gerald M. Forlenza
Assistant Examiner—John Mannix
Attorney—Donnelly, Mentag & Harrington

[57] ABSTRACT

A spare tire and wheel carrier for a pick-up truck which includes a cross member pivotally mounted at its upper ends to the vehicle frame. A longitudinal center member having an inner end fixed to the cross member and an outer end releasably locked to the vehicle frame.

5 Claims, 8 Drawing Figures

PATENTED MAY 29 1973

INVENTOR.
John Hrivnyak
BY Donnelly, Mentag & Henington
ATTORNEYS

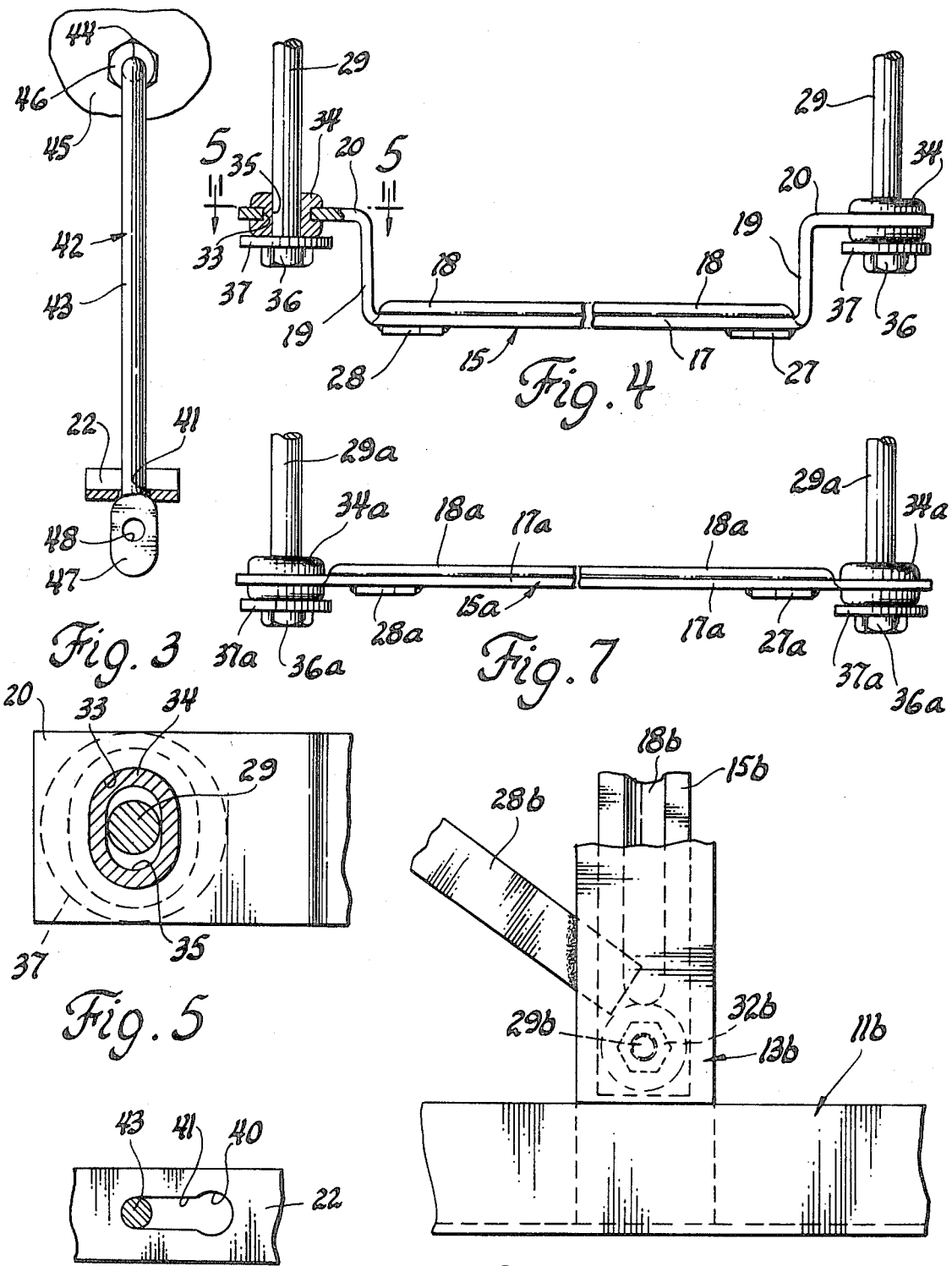

SPARE TIRE AND WHEEL CARRIER FOR PICK-UP TRUCKS

SUMMARY OF THE INVENTION

This invention relates to a tire and wheel carrier for vehicles such as a pick-up truck.

Heretofore, it has been common practice to provide pick-up trucks and the like with a spare tire and wheel carrier which is disposed beneath the rear end of the vehicle and attached to the vehicle frame members in such a position, whereby it requires a person to put forth a great effort from an awkward position from under the truck to load a tire into the carrier, and to remove a tire therefrom. Accordingly, it is an object of the present invention to provide a novel and improved spare tire and wheel carrier which overcomes the disadvantages of the prior art spare tire and wheel carriers.

It is another object of the present invention to provide a spare tire and wheel carrier which is simple and compact in construction, economical to manufacture and efficient in operation.

It is still another object of the present invention to provide a spare tire and wheel carrier for a vehicle having a frame, and which comprises, a transversely disposed supporting cross member, a longitudinally disposed center supporting member having its inner end secured to the cross member at a central point on the cross member, brace means mounted between said cross member and said longitudinal central member, a hanger means on each end of said cross member with the upper ends of each hanger means being fixedly secured to the vehicle frame, means pivotally mounting the outer ends of the cross member on the lower ends of said hanger means, and, means operatively mounted on said vehicle for a releasable locking engagement with the outer end of said longitudinal center member to retain the spare tire carrier in a transporting position.

Other objects, features and advantages of this invention will be apparent from the following detailed description, appended claims, and the accompanying drawings.

BRIEF DESCRIPTION OF THE DRAWINGS

FIG. 3 is a fragmentary, elevational, section view of the structure illustrated in FIG. 1, taken along the line 3—3 thereof, and looking in the direction of the arrows.

FIG. 4 is a fragmentary, broken, elevational view, partly in section, of the structure illustrated in FIG. 1, taken along the line 4—4 thereof, and looking in the direction of the arrows.

FIG. 5 is a fragmentary, enlarged, horizontal section view of the structure illustrated in FIG. 4, taken along the line 5—5 thereof, and looking in the direction of the arrows.

FIG. 6 is a fragmentary, enlarged, plan view of the structure illustrated in FIG. 1, taken along the line 6—6 thereof, and looking in the direction of the arrows.

FIG. 7 is a view similar to FIG. 4 and showing a modification of the invention.

FIG. 8 is a fragmentary, top plan view of another modification of the invention.

DESCRIPTION OF THE PREFERRED EMBODIMENTS

Figure 1:
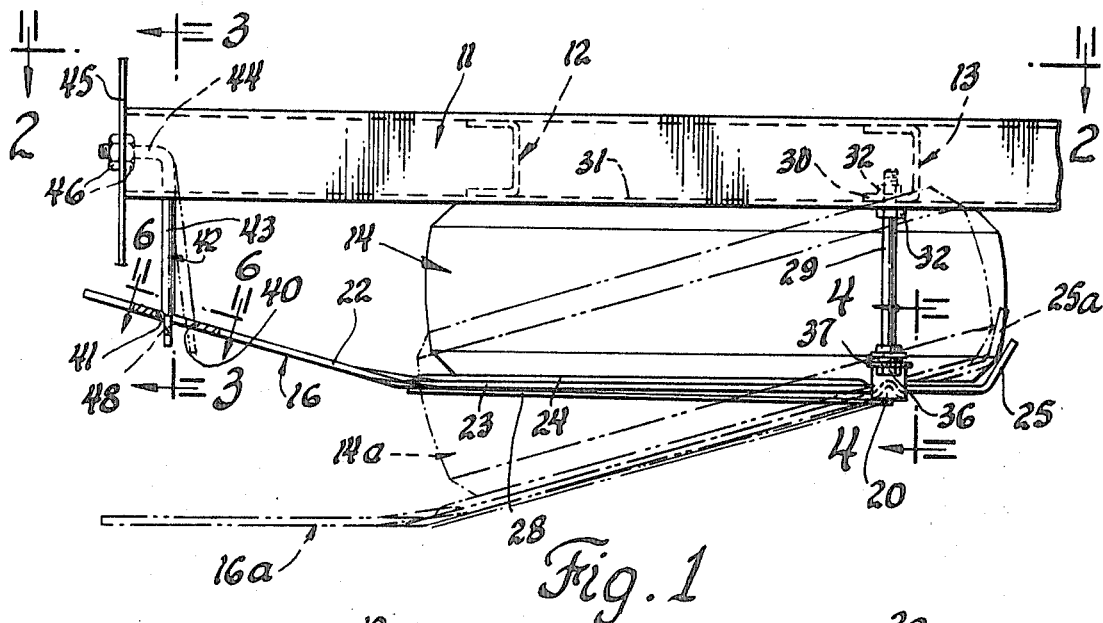
FIG. 1 is a side elevational view of a spare tire carrier made in accordance with the principles of the present invention.
Figure 2:
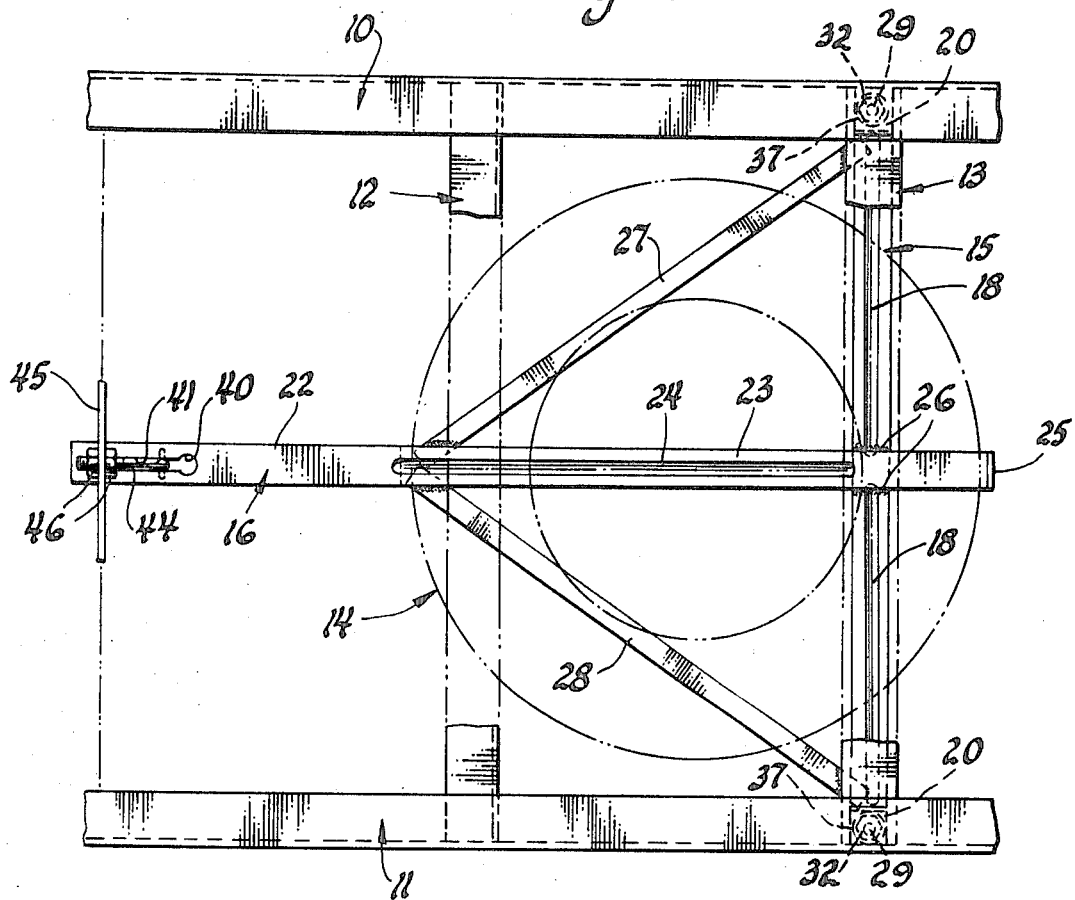
FIG. 2 is a top plan view of the structure illustrated in FIG. 1, taken along the line 2—2 thereof, and looking in the direction of the arrows.

Referring now to the drawings, and in particular to FIGS. 1 and 2, the numerals 10 and 11 generally designate the usual, spaced apart, longitudinal vehicle frame members which are illustrated as being channel shaped in cross section. The numerals 12 and 13 generally designate a pair of conventional transverse vehicle frame channel members which have their ends slidably mounted within the longitudinal channel members 10 and 11 and as which are secured thereto, by any suitable means, as by welding. The numeral 14 generally designates a spare tire and wheel for a vehicle, such a a pick-up truck, which is adapted to be held in the solid line position shown in FIG. 1 for transporting purposes. The numeral 14a shows the tire and wheel in broken lines in a lowered position where it may be loaded onto a unloaded from the spare tire and wheel carrier of the present invention.

As best seen in FIGS. 2 and 3, the spare tire carrier of the present invention includes a transversely extending cross frame member 15 which is welded at the center thereof to the underside of the inner end of a longitudinally extended center bar, generally indicated by the numeral 16. The longitudinal center bar 16 includes an inner end portion 23 which is welded to the cross frame member 15, as indicated by the numerals 26 in FIG. 2. An upwardly extended stop flange member 25 is integrally formed on the inner end of the center bar inner portion 23, as shown in FIG. 1. The outer end portion of the center bar 16 is indicated in FIGS. 1 and 2 by the numeral 22, and it is bent upwardly so as to form an obtuse angle between the center bar portions 22 and 23.

The center bar portion 23 is provided with an upwardly protruding strength bead 24 which is formed by expanding the longitudinal center portion of the center bar portion 23 upwardly. The center portion 17 of the cross frame member 15 is also expanded upwardly to form the two strength beads 18 on each side of the center bar portion 23, as shown in FIG. 2. A pair of brace bars 27 and 28 are disposed on opposite sides of the center bar portion 23. As shown in FIG. 2, the front ends of the brace bars 27 are secured to the front end of the center bar portion 23 by any suitable means, as by welding. The rear ends of the brace bars 27 and 28 are secured to the cross frame member 15 by any suitable means, as by welding. The brace bars 27 and 28 are disposed at acute angles relative to the center bar portion 23. It will be seen that the cross frame member 15 and the longitudinal center bar 16 form a cross-shaped tire and wheel carrier means which is provided with the angularly disposed side brace bars 27 and 28.

As shown in FIGS. 1, 2 and 3, the outer ends of the cross member 15 are fixedly secured to the vehicle frame channels by similar means and the corresponding parts have been marked with the same reference numerals. As best seen in FIG. 4, the outer ends of the cross frame member 15 are stepped so as to provide a central portion 17 with integral vertical leg portions 19 to which are integrally attached at the upper ends thereof horizontally extended end flanges 20. Each of the end flanges 20 is pivotally secured to the vehicle frame channels by the following described structure.

As shown in FIGS. 2 and 4, a hanger bolt 29 is fixedly connected to each of the outer ends of the transverse channel 13. The bolts 29 extend upwardly through the lower flanges 31 of the longitudinal channel members 10 and 11 and through the lower flanges 30 of the transverse channel 13. The bolts 29 are secured in a suitable vertically adjusted position by any suitable means, as by a pair of lock nuts 32. As illustrated in FIGS. 4 and 5, the lower ends of each of the hanger bolts 29 extend through suitable elongated holes 33 formed in the cross member horizontal end flanges 20. The elongated holes 33 are disposed with their longest dimension in alignment with the longitudinal direction of the vehicle channel members 10 and 11 to permit the longitudinal center member 16 to be pivoted upwardly and downwardly about the lower ends of the bolts 29. A suitable rubber washer, such as a grommet 34, is disposed in each of the elongated holes 33 in the cross member flanges 20, and these grommets 34 are each provided with an elongated opening or hole 35 through which a hanger bolt 39 extends. The lower end of each of the bolts 29 is provided with the usual bolt head 36. As best seen in FIG. 4, a washer 37 is disposed between each bolt head 36 and the lower end of each grommet 34.

It will be seen that the spare tire and wheel support structure is substantially shaped in the form of a cross, and that it may be pivoted from an upward locked position, shown by solid lines in FIG. 1, to a downward loading an d unloading position, indicated by the broken line position in FIG. 1. The pivoting action of the tire and wheel support structure is provided by the pivoting of the structure relative to the hanger bolts 29 because of the elongated holes 35 in the grommets 34. The grommets 34 also reduce noise and rattling during normal tire storage use.

The outer end of the center bar portion 22 is adapted to be latched in place by the following described latch hanger and locking means. As best seen in FIG. 6, an elongated slot 41 is formed through the center bar portion 22 adjacent its outer end. A circular hole 40 is also formed in the center bar portion 22 and it communicates with the inner end of the slot 41 to form a key-shaped opening. A locking spring rod, generally indicated by the numeral 42, is adapted to co-act with the hole 40 and the slot 41 for releasably securing the tire and wheel support structure in the locked and transporting solid-line position, as illustrated in FIG. 1.

As shown in FIGS. 1 and 3, the locking spring rod 42 includes a vertical portion 43 and an integral upper horizontal arm 44. The outer end of the arm 44 is extended through a suitable hole in the usual rear panel 45 of a vehicle, and it is secured in place by any suitable means, as by a pair of lock nuts 46. When the locking rod 42 is in the released position, it springs forwardly of the vehicle to the dotted line position shown in FIG. 1.

Integrally formed on the lower end of the downwardly extended vertical leg portion of the rod 42 is an enlarged head 47 through which is formed a hole 48 for the reception of a suitable lock for locking the tire and wheel carrier in the transporting solid line position of FIG. 1. FIGS. 1, 2, 3 and 6 illustrate the locking spring rod snapped into the locked position. In order to lock the tire carrier in the transporting position, the center bar 16 is moved upwardly and the enlarged head 47 is moved downwardly through the round hole 40. The rod portion 43 is then manually grasped and snapped forward so as to move the rod portion 43 into the slot 41. The weight of the spare tire carrier then acts downwardly by gravity to hold the locking spring rod 42 in the solid line position shown in FIG. 1. A suitable lock may then be inserted through the hole 48 to prevent against theft and to secure the spare tire and wheel carrier in the transporting position. The rods 42 may be coated wth a sound deadening material, if desired.

FIG. 7 illustrates a modification of the invention, and the parts thereof which correspond to the parts of the first embodiment of FIGS. 1 through 4 have been marked with the same reference numerals followed by the small letter "a." . In the embodiment of FIG. 7, the transversely extending cross frame member 15a is formed flat and it is not stepped as in the first embodiment of FIG. 4. The embodiment of FIG. 7 functions in the same manner as the embodiment of FIGS. 1 through 4, with the exception that the hanger bolts 29a will be substantially longer. The embodiment of FIGS. 1 through 4 could be used with shorter hanger bolts 29.

FIG. 8 illustrates a second embodiment of the invention in which the outer ends of the cross member 15b are secured directly to a vehicle transverse channel member, as 13b instead of to both the transverse channel member and the longitudinal channel member. The cross member 15b is illustrated as being of the type shown in FIG. 7. However, it will be understood that it may also be of the stepped construction as shown in FIG. 4. The parts of the embodiment of FIG. 8 which are the same as the first embodiment of FIGS. 1 through 4 have been marked with the same reference numerals, followed by the small letter "b." The embodiment of FIG. 8 functions in the same manner as the embodiment of FIGS. 1 through 4.

While it will be apparent that the preferred embodiments of the invention herein disclosed are well calculated to fulfill the objects above stated, it will be appreciated that the invention is susceptible to modification, variation and change.

What I claim is:

1. A spare tire and wheel carrier for a vehicle having a frame, comprising:
   a. a transversely disposed supporting cross member;
   b. a longitudinally disposed center supporting member having its inner end secured to the cross member at a central point on the cross member;
   c. brace means mounted between said cross member and said longitudinal central member;
   d. a hanger means on each end of said cross member with the upper ends of each hanger means being fixedly secured to the vehicle frame;
   e. means pivotally mounting the outer ends of the cross member on the lower ends of said hanger means;
   f. means operatively mounted on said vehicle for a releasable locking engagement with the outer end of said longitudinal center member to retain the spare tire carrier in a transporting position;
   g. said means pivotally mounting the outer ends of the cross member on the lower ends of said hanger means, including,
      1. said cross member being provided on each of its outer ends iwth an elongated opening which is disposed with its longest dimension longitudinally of the vehicle; and,
2. each of said hanger means including a hanger bolt having its lower end extended through one of said elongated holes and provided with means for supporting one of the ends of the cross member; and,
h. grommet means operatively mounted in each of said elongated holes and surrounding the hanger bolt extended through said hole.

2. A spare tire and wheel carrier as defined in claim 1, including:
a. a retainer flange formed on the inner end of the longitudinal center member.

3. A spare tire and wheel carrier for a vehicle having a frame, comprising:
a. a transversely disposed supporting cross member;
b. a longitudinally disposed center supporting member having its inner end secured to the cross member at a central point on the cross member;
c. brace means mounted between said cross member and said longitudinal central member;
d. a hanger means on each end of said cross member with the upper ends of each hanger means being fixedly secured to the vehicle frame;
e. means pivotally mounting the outer ends of the cross member on the lower ends of said hanger means; and,
f. means operatively mounted on said vehicle for a releasable locking engagement with the outer end of said longitudinal center member to retain the spare tire carrier in a transporting position, including,
   1. a spring rod having its upper end secured to the vehicle and its lower end extended downwardly and adapted to spring longitudinally forward of the vehicle in a free state; and,
   2. said longitudinal center member being provided with a key-shaped opening through which said downwardly extended member may be pmoved and snapped into a locked position.

4. A spare tire and wheel carrier as defined in claim 3 wherein:
a. said spring rod is provided with an enlarged head on its lower end which is adapted to be extended through the large end of the key shaped opening and then moved toward the outer end of the longitudinal center member so as to move the spring rod into the narrow portion of the key shaped opening, whereby the longitudinal center member is then moved downwardly by gravity into a locked seating position on the upper end of said enlarged head.

5. A spare tire and wheel carrier as defined in claim 3, wherein said means pivotally mounting the outer ends of the cross member on the lower ends of said hanger means, includes:
a. said cross member being provided on each of its outer ends with an elongated opening which is disposed with its longest dimension longitudinally of the vehicle; and,
b. each of said hanger means including a hanger bolt having its lower end extended through one of said elongated holes and provided with means for supporting one of the ends of the cross member.

* * * * *